United States Patent
Raymond et al.

(10) Patent No.: US 6,943,987 B1
(45) Date of Patent: Sep. 13, 2005

(54) SERVO WRITE HEAD

(75) Inventors: Robert M. Raymond, Boulder, CO (US); Richard H. Dee, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 306 days.

(21) Appl. No.: 10/330,895

(22) Filed: Dec. 27, 2002

(51) Int. Cl.[7] .......................... G11B 21/02; G11B 5/584
(52) U.S. Cl. .................................... 360/121; 360/77.12
(58) Field of Search ........................ 360/119, 121–122, 360/125–126, 77.12

(56) References Cited

U.S. PATENT DOCUMENTS

| 5,572,392 | A | * | 11/1996 | Aboaf et al. ............... 360/126 |
| 5,963,400 | A | * | 10/1999 | Cates et al. ................ 360/317 |
| 6,005,737 | A | * | 12/1999 | Connolly et al. ............. 360/75 |
| 6,104,562 | A | * | 8/2000 | Ottesen et al. ............... 360/63 |
| 6,166,870 | A | * | 12/2000 | Cates et al. ................. 360/48 |
| 6,392,840 | B1 | * | 5/2002 | Chen ......................... 360/126 |
| 6,710,967 | B2 | * | 3/2004 | Hennecken et al. ...... 360/77.12 |

* cited by examiner

Primary Examiner—Brian E. Miller
(74) Attorney, Agent, or Firm—Yee & Associates, P.C.

(57) ABSTRACT

A servo write head for magnetic tape is provided. The invention includes first and second non-magnetic substrates and first and second magnetic layers deposited between the non-magnetic substrates. A middle non-magnetic substrate is then deposited between the first and second magnetic layers and forms the magnetic gap. In one embodiment, non-magnetic protective layers are placed between the middle substrate and magnetic layers and form part of the gap. A contoured top layer of magnetic material is deposited across the other layers and substrates and has at least one recording gap, and wherein the top layer forms a magnetic pattern for writing a servo pattern to the tape.

15 Claims, 1 Drawing Sheet

SERVO WRITE HEAD

BACKGROUND OF THE INVENTION

1. Field of the Invention

The present invention relates generally to magnetic tape heads, and more specifically to writing complex servo patterns on flexible magnetic storage media.

2. Background of the Invention

Advanced linear recording media (tapes) store data on multiple data tracks, which run parallel to each other over the length of the tape. However, there is an inherent problem associated with independent data tracks. As the tape moves past the tape head, lateral drift of the tape could result in the head reading or writing on the wrong data track. This would obviously degrade the quality of data storage and retrieval. To ensure that the tape heads are accurately positioned relative to the tape, dedicated servo tracks are usually recorded on the tape parallel to the data tracks. Servo readers on the tape head read these servo tracks. The servo readers then signal mechanisms within the tape drive that are capable of adjusting the tape head in order to maintain proper alignment with the data tracks.

The servo tracks themselves are written to the tape during manufacture by special servo write heads. The head typically has multiple writing gaps, which permit several servo tracks to be written simultaneously across the width of the tape. This increases position accuracy between the servo tracks relative to each other. Currently, servo write heads are constructed from ferrite, which has several limitations. One limitation is the magnetic frequency response. Another limitation is the fact that most of the materials used in thin-film wafer manufacture of recording heads use non-ferrite materials, which are more readily available than ferrite and allow for more process flexibility and compatibility. Thus, using ferrite for the servo write heads increases manufacturing costs due to the need to use different materials and deposition techniques than those used to construct thin-film read/write head wafers.

Therefore, it would be desirable to have a method for constructing servo track write heads using non-ferrite materials.

SUMMARY OF THE INVENTION

The present invention provides a servo write head for magnetic tape. The invention includes first and second non-magnetic substrates and first and second magnetic layers deposited between the non-magnetic substrates. A middle non-magnetic substrate is then deposited between the first and second magnetic layers and forms the magnetic gap(s). In one embodiment, non-magnetic protective layers are placed between the middle substrate and magnetic layers and form part of the gap. A contoured top layer of magnetic material is deposited across the other layers and substrates and has at least one recording gap, and wherein the top layer forms a magnetic pattern for writing a servo pattern to the tape.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
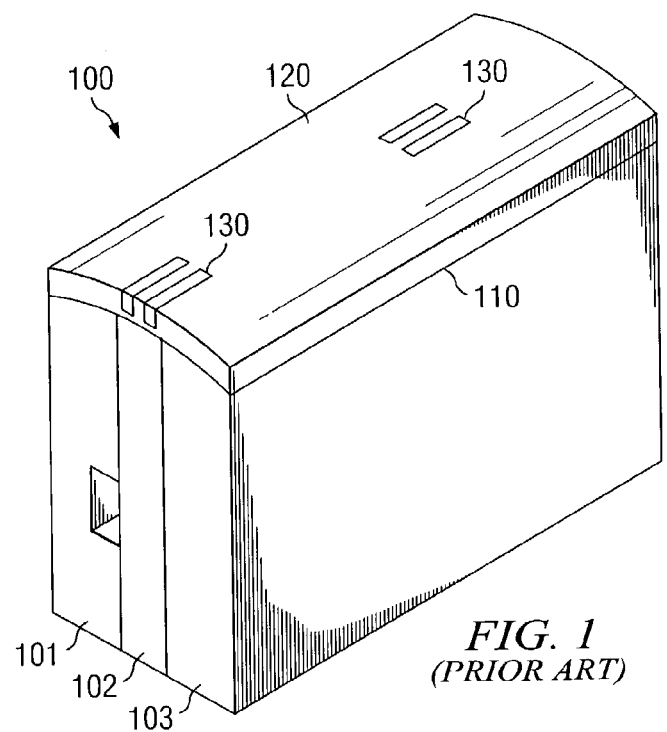
FIG. 1 depicts a schematic diagram illustrating a servo write head in accordance with the prior art.

Referring to FIG. 1, a schematic diagram illustrating a servo write head is depicted in accordance with the prior art. Servo write head 100 is fabricated from two parallel pieces of ferrite 101 and 103, separated by a layer of glass 102. The top surface of the servo write head 100 is curved. This curved surface is first covered with a thin magnetic seed layer 110 and then with a layer of magnetic material 120 several microns thick. The gaps 130 that define the writing pattern extend through the magnetic layer 120 to the seed layer 110 over the central glass region 102. A wire (not shown) passes through a groove 140 in the ferrite 101 extending across the long axis of the head 100 next to the glass layer 102. Current passing through the wire energizes magnetic fields in the gaps 130. The magnetic field writes the gap pattern on the passing tape (not shown).

The present invention provides a servo track write head made from non-ferrite materials. Non-ferrite substrates and thin-film materials are used to manufacture most read/write head wafers and are therefore more readily available than ferrite. Using such thin-film materials makes it easier to manufacture the servo write heads because there is no need to use different materials and deposition techniques than those already used in modern recording head wafer processing facilities.

In addition, the non-ferrite, thin-film materials allow for higher magnetic frequency response. This allows the present invention to write servo tracks at higher speeds, with sharper transitions, than possible with the prior art ferrite servo writers.

Figure 2:
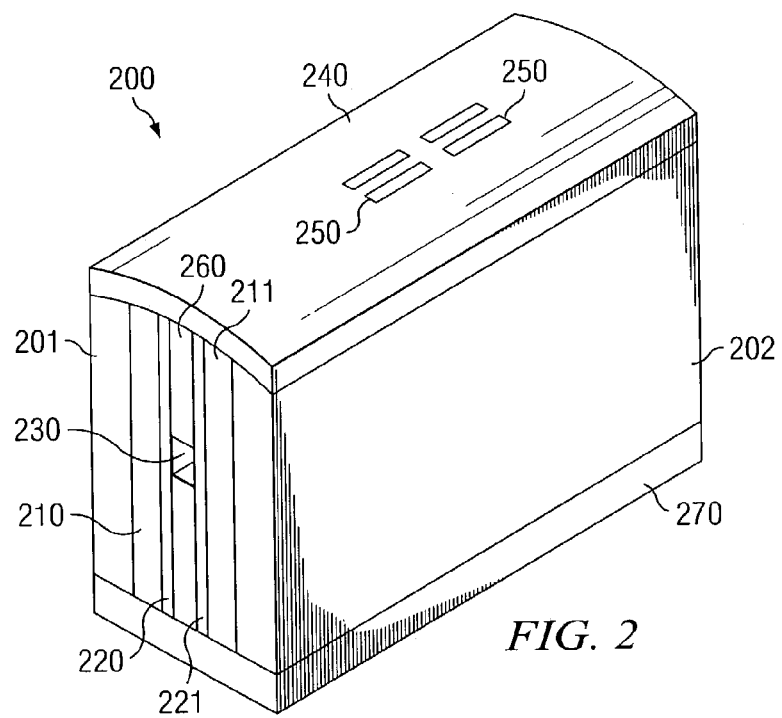
FIG. 2 depicts a schematic diagram illustrating a servo write head in accordance with the present invention.

Referring to FIG. 2, a schematic diagram illustrating a servo writer head is depicted in accordance with the present invention. The head 200 shown in FIG. 2 is constructed using non-magnetic substrate materials with thin-film magnetic poles and a non-magnetic gap. As explained above, these materials are used instead of ferrite in order to give higher frequency response and to use materials that are available on modern recording head wafer processing facilities.

The substrates 201 and 202 are made from a non-magnetic material, e.g., $Al_2O_3TiC$. Currently, almost all thin-film processing lines use $Al_2O_3TiC$ substrates. Deposited on the substrates 201 and 202 are magnetic layers 210 and 211, which are made of, e.g., CoZrTa, NiFe, or similar magnetic compounds. The thickness of the magnetic layers 210 and 211 is large enough to ensure that adequate magnetic flux is delivered to the top magnetic layer 240 (discussed further below).

Non-magnetic layers 220 and 221 are deposited on top of the magnetic layers 210 and 211, respectively. These non-magnetic layers 220 and 221 form a protective layer and part of the gap. They may be composed of conducting or non-conducting materials such as, e.g., $Al_2O_3$, $Si_3N_4$, $SiO_2$, TI, AU, Cu, Al, etc.

A non-magnetic thin substrate 260 is bonded onto one of the non-magnetic layers 220 or 221. This thin substrate 260 may be composed of materials such as, e.g., $Al_2O_3TiC$, glass, Cu, SiC, Sapphire, Barium Titanate, etc., and forms the bulk of the gap between the magnetic layers 210 and 211. Its thickness is large enough to obtain the required efficiency for coupling flux from the coil to the top magnetic layer 240. Multiple sections of thin substrate 260 are bonded, forming a gap to construct slot 230. Alternatively, the slot 230 can be formed by selectively etching between thin substrate 260 and non-magnetic layer 220 (or 221). An inductive wire winding (not shown) with one or more turns passes through the slot 230.

After the layers described above have been bonded together, the top surface is shaped as desired, followed by a top magnetic layer 240 that is deposited onto the head. This layer is composed of magnetic materials such as NiFe, CoZrTa, FeN, etc. The desired recording gaps 250 are then etched into magnetic layer 240 using standard techniques. Electric current passing through the wire winding produces magnetic flux in the head structure, which in turn writes the gap pattern onto passing tape.

To improve performance, a flux closure piece 270 made of magnetic material (e.g., ferrite) or magnetic material-coated substrate material (e.g., ferrite, NiFe, CoZrTa, or FeN on $Al_2O_3TiC$) is bonded to the bottom of the head.

Additional options that may be applied to the present invention include lamination of the thin magnetic films and orientation of magnetic domains in the head stucture magnetic materials. It is will known that in the art that lamination reduces induced eddy currents within the thin-film magnetic pole materials improving the frequency response of the write head.

Controlling the magnetic domains within the thin-film magnetic poles increases the magnetic switching speed of the head by enabling magnetic rotation rather than domain wall motion for flux conduction in the magnetic materials in the head. Such orientation is not possible with the ferrite used in prior art servo write head designs.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A servo write head for magnetic tape, the servo write head comprising:
   first and second non-magnetic substrates;
   first and second magnetic layers deposited between the first and second non-magnetic substrates;
   a third non-magnetic substrate deposited between the first and second magnetic layers, wherein the third non-magnetic substrate forms a magnetic gap;
   an inductive wire coil operatively disposed with respect to the first, second, and third non-magnetic substrates and the first and second magnetic layers; and
   a third, contoured, top layer of magnetic material deposited across the first, second, and third non-magnetic substrates and the first and second magnetic layers, wherein the top layer has at least one recording gap, and wherein the top layer and recording gap form a magnetic field pattern to form a recorded servo pattern on the tape when electric current is fed through the coil.

2. The servo write head according to claim 1, further comprising:
   first and second non-magnetic protective layers, wherein the first and second protective layers form part of the magnetic gap;
   wherein the first protective layer is deposited between the first magnetic layer and third non-magnetic substrate; and
   wherein the second protective layer is deposited between the second magnetic layer and third non-magnetic substrate.

3. The servo write head according to claim 2, wherein the first and second protective layers are composed of one of the following:
   $Al_2O_3$;
   $Si_3N_4$;
   $SiO_2$;
   TI;
   AU;
   Cu; and
   Al.

4. The servo write head according to claim 1, further comprising a magnetic flux closure substrate bonded to the bottom of the servo write head opposite the third top layer.

5. The servo write head according to claim 4, wherein the magnetic flux closure is composed of magnetic material.

6. The servo write head according to claim 5, wherein the magnetic flux closure is composed of ferrite.

7. The servo write head according to claim 4, wherein the magnetic flux closure is composed of a non-magnetic substrate coated with magnetic material.

8. The servo write head according to claim 7, wherein the magnetic flux closure is composed of $Al_2O_3TiC$ coated with one of the following:
   ferrite;
   NiFe;
   CoZrTa; and
   FeN.

9. The servo write head according to claim 1, wherein the servo write head has a channel within the third non-magnetic substrate through which the inductive wire passes.

10. The servo write head according to claim 1, wherein the third top layer of magnetic material has a plurality of recording gaps.

11. The servo write head according to claim 1, wherein the non-magnetic substrates and first and second magnetic layers are part of a thin-film wafer.

12. The servo write head according to claim 1, wherein the first and second non-magnetic substrates are composed of $Al_2O_3TiC$.

13. The servo write head according to claim 1, wherein the third non-magnetic substrate is composed one of the following:
   $Al_2O_3TiC$;
   glass;
   copper;
   SiC;
   sapphire; and
   barium titanate.

14. The servo write head according to claim 1, wherein the first and second magnetic layers are composed of one of the following:
   CoZrTa; and
   NiFe.

15. The servo write head according to claim 1, wherein the third, top, magnetic layer is composed of one of the following:
   NiFe;
   CoZrTa; and
   FeN.

* * * * *